United States Patent
Rankin et al.

(10) Patent No.: US 9,416,880 B2
(45) Date of Patent: Aug. 16, 2016

(54) ROTARY METERING VALVE ASSEMBLY AND METHOD OF MODIFYING CONTACT SURFACE FOR REDUCING GAUGE WRINGING

(71) Applicant: Hamilton Sundstrand Corporation, Charlotte, NC (US)

(72) Inventors: Kevin M. Rankin, Windsor, CT (US); Peter M. Ballard, Einfield, CT (US); Todd Haugsjaahabink, Springfield, MA (US); Glen A. Pruden, Somers, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 129 days.

(21) Appl. No.: 14/186,185

(22) Filed: Feb. 21, 2014

(65) Prior Publication Data

US 2015/0108385 A1   Apr. 23, 2015

Related U.S. Application Data

(60) Provisional application No. 61/892,823, filed on Oct. 18, 2013.

(51) Int. Cl.
| | |
|---|---|
| *F16K 3/04* | (2006.01) |
| *F16K 3/02* | (2006.01) |
| *B23P 6/00* | (2006.01) |
| *F16K 25/00* | (2006.01) |
| *F02C 7/232* | (2006.01) |
| *F02C 9/26* | (2006.01) |

(52) U.S. Cl.
CPC .................. *F16K 3/0209* (2013.01); *B23P 6/00* (2013.01); *F02C 7/232* (2013.01); *F02C 9/263* (2013.01); *F16K 3/04* (2013.01); *F16K 25/00* (2013.01); *F05D 2300/516* (2013.01); *Y10T 29/49407* (2015.01)

(58) Field of Classification Search
CPC ....... F16K 11/074; F16K 25/005; F16K 3/04; F16K 3/08; F05D 2300/516
USPC .................................................. 251/314, 368
See application file for complete search history.

(56) References Cited

U.S. PATENT DOCUMENTS

| 4,420,142 A | 12/1983 | Dworak et al. |
| 5,829,735 A | 11/1998 | Ikeda |

(Continued)

FOREIGN PATENT DOCUMENTS

| GB | 2085146 A | 4/1982 |
| JP | 2003166656 A | 6/2003 |

(Continued)

OTHER PUBLICATIONS

Search Report regarding related GB Application No. GB1418416.2; dated Apr. 23, 2015, 5 pgs.

*Primary Examiner* — Matthew W Jellett
(74) *Attorney, Agent, or Firm* — Cantor Colburn LLP

(57) ABSTRACT

A rotary metering valve assembly includes a stationary body plate having a first contact surface. Also included is a valve plate having a second contact surface disposed in contact with the first contact surface of the stationary body plate, wherein the valve plate is configured to rotate relative to the stationary body plate. At least one of the first contact surface and the second contact surface comprises a surface flatness of less than about 2.4 μm (about 93 μin) and a surface roughness of at least about 0.2 μm (about 8 μin).

9 Claims, 3 Drawing Sheets

(56) References Cited

U.S. PATENT DOCUMENTS

2007/0068873 A1* 3/2007 Oroskar et al. ............... 210/659
2008/0067463 A1   3/2008 Jones et al.

FOREIGN PATENT DOCUMENTS

| JP | 2006052743 A | 8/2004 |
| JP | 2006009991 A | 12/2006 |

* cited by examiner

ROTARY METERING VALVE ASSEMBLY AND METHOD OF MODIFYING CONTACT SURFACE FOR REDUCING GAUGE WRINGING

CROSS-REFERENCE TO RELATED APPLICATIONS

This patent application claims priority to U.S. Provisional Application No. 61/892,823, filed Oct. 18, 2013, which is incorporated herein by reference in its entirety.

BACKGROUND OF THE INVENTION

The embodiments herein relate to rotary metering valve assemblies, as well as a method of modifying a contact surface of the rotary metering valve assembly for reducing gauge wringing.

Rotary metering valve assemblies may be used in a variety of applications that require the regulation of a fluid. A fuel metering valve assembly is an example of such an application. Among other components, the assembly includes a valve plate and a valve body. The valve plate is angularly movable relative to the valve body under the control of, for example, a suitable motor. The motor moves the plate between a positions in which metering orifices of the valve plate and valve body dictate an open flow area. The open flow area is based on relative location of the metering orifices which changes with rotation of the valve plate. Contact between the valve plate and the valve body impose hydraulic and frictional forces and the assembly is, thus, designed to avoid "sticking" therebetween.

BRIEF DESCRIPTION OF THE INVENTION

According to one embodiment, a rotary metering valve assembly includes a stationary body plate having a first contact surface. Also included is a valve plate having a second contact surface disposed in contact with the first contact surface of the stationary body plate, wherein the valve plate is configured to rotate relative to the stationary body plate. At least one of the first contact surface and the second contact surface comprises a surface flatness of less than about 93 μin and a surface roughness of at least about 0.2 micrometers (μm) (about 8 μin).

According to another embodiment, a method of modifying a contact surface of a rotary metering valve assembly for reducing gauge wringing is provided. The method includes smoothening a contact surface of the rotary valve assembly to a desired surface flatness. The method also includes roughening the contact surface to a surface roughness of at least about 0.2 μm (about 8 μin). The method further includes maintaining the desired surface flatness while roughening the contact surface.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
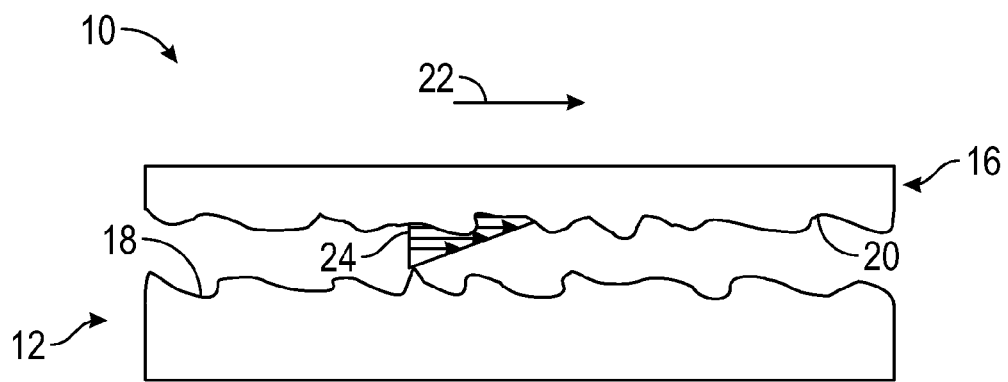
FIG. 1 is a partial schematic illustration of a valve plate and a valve body of a rotary metering valve assembly.

Referring to FIG. 1, a portion of a rotary metering valve assembly 10 is shown. The rotary metering valve assembly 10 may be employed in conjunction with numerous applications. In particular, the embodiments of the rotary metering valve assembly 10 described herein may be part of any lubricated application with low to moderate loading and where flat, smooth plates are in frictional contact and move relative to each other with low velocity, such as a rotary plate metering valve application. In one embodiment, the rotary metering valve assembly 10 is a component of a fuel metering unit for a gas turbine engine located on an aircraft.

Figure 2:
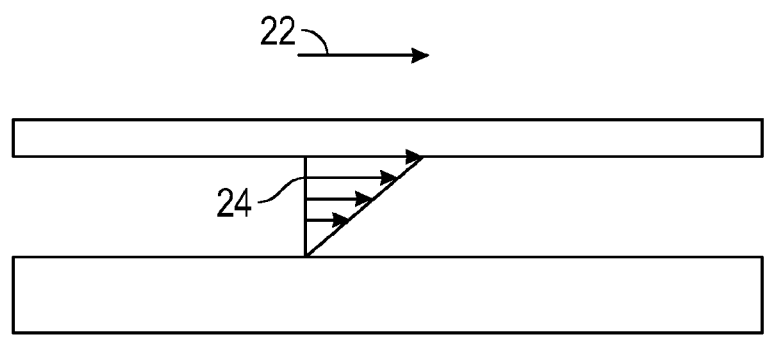
FIG. 2 is a schematic illustration of a first plate and a second plate having a fluid flowing therebetween.
Figure 3:
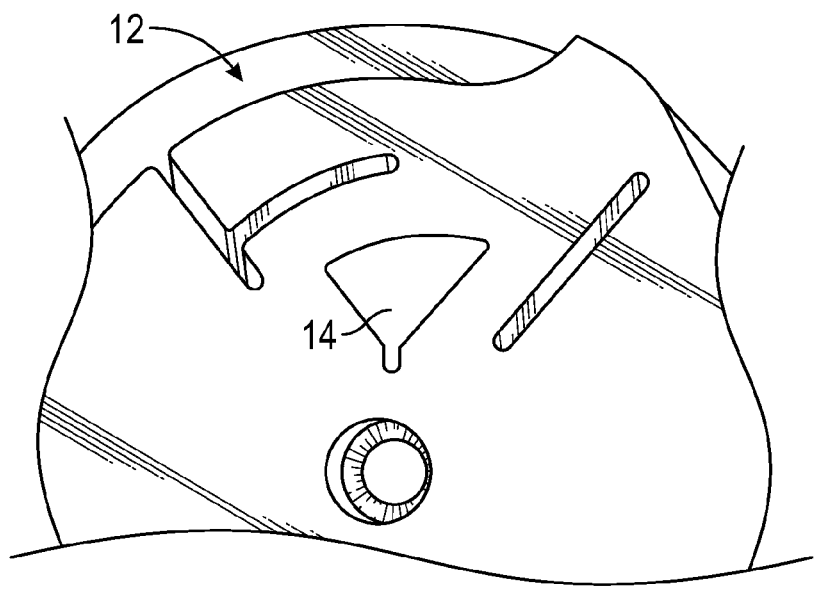
FIG. 3 illustrates a contact surface of the valve body having a first surface roughness.
Figure 4:
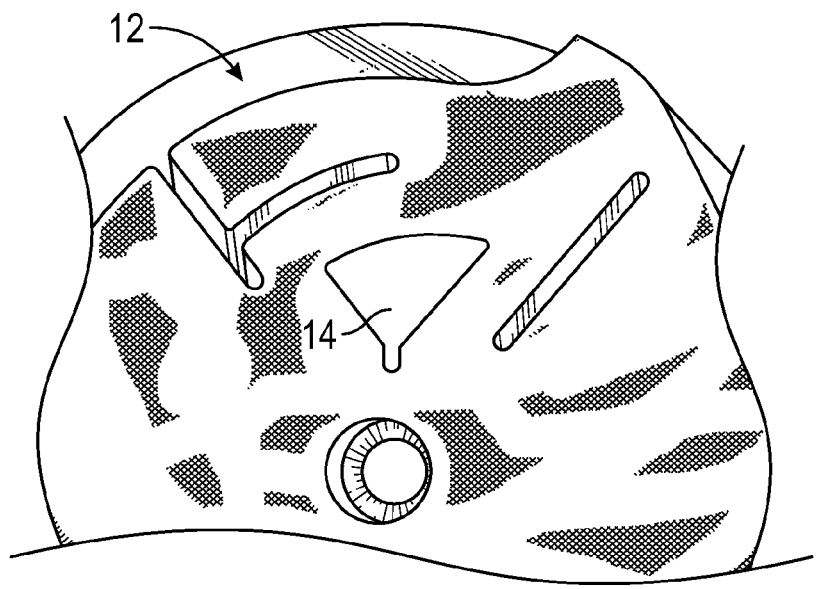
FIG. 4 illustrates the contact surface of the valve body having a second surface roughness after being subjected to a surface roughening process.

The rotary metering valve assembly 10 includes a stationary body plate 12 that includes at least one metering orifice 14 (FIGS. 3 and 4). A valve plate 16 abuts a surface of the stationary body plate 12 and is angularly movable by a drive arrangement to vary the degree by which the valve plate 16 obscures the at least one metering orifice 14. In certain embodiments, the valve plate 16 also includes a metering orifice. Rotation of the valve plate 16 controls a flow area upon which a fluid, such as fuel, can flow. Due to the shape of the metering orifice(s), the size of the flow area varies as a function of angle from zero to full stroke. The torque required to open and close the valve may be expressed with the following equation for a situation relating to relative movement between circular plates, as shown in FIG. 2:

$$\text{Torque} = \frac{\pi \mu \omega R^4}{2h}$$

where ω is the angular velocity; μ is the absolute viscosity; R the radius of the surface area of contact; and h is the distance between the plates. Based on the significance of the surface area (i.e., fourth power), a reduction of the surface area is desirable. Additionally, as the surface finish of the contact surfaces is finer, the plates become closer together, thereby increasing the required torque. As shown in FIG. 1, the valve plate 16 rotates relative to the stationary body plate 12 in a direction 22 and a fluid velocity profile is referenced with numeral 24.

The stationary body plate 12 and the valve plate 16 may be formed of various materials. In one embodiment, the stationary body plate 12 is formed of a hard steel-based alloy, such as Greek Ascoloy™ (42-50 HRC) and the valve plate 16 is formed of a nitride steel-based alloy. The valve plate 16 is assembled with a light spring load which keeps it in contact with the stationary body plate 12. An additional load is imposed during operation of the rotary metering valve assembly 10 due to a pressure differential, thereby further loading the valve plate 16 against the stationary valve plate 12.

As noted above, the valve plate 16 abuts a surface of the stationary body plate 12. Specifically, the stationary body plate 12 includes a first contact surface 18 that is disposed in contact with a second contact surface 20 of the valve plate 16.

With the above torque equation mind, the embodiments herein mitigate gauge wringing between the stationary body plate 12 and the valve plate 16, while adhering to flatness requirements of the plates. Low flatness is required to minimize leakage and wear. Low roughness is typically associated with the low flatness, but the embodiments herein increase roughening to mitigate gauge wringing, while still meeting acceptable levels of leakage and wear. This is achieved by roughening the first contact surface 18 and/or the second contact surface 20. In one embodiment, only the first contact surface 18 is roughened to an enhanced surface roughness. However, it is contemplated that the second contact surface 20 may be additionally roughened in the alternative to, or in combination with, the first contact surface 18.

The first contact surface 18 and/or the second contact surface 20 comprise a surface flatness of less than or equal to about 2.4 μm (about 93 μin) and a surface roughness of greater than or equal to about 0.2 μm (about 8 μin). In one embodiment, the surface roughness ranges from about 0.2 μm (about 8 μin) to about 0.8 μm (about 32 μin). In yet another embodiment, the surface roughness is about 0.6 μm (about 24 μin).

Figure 5:
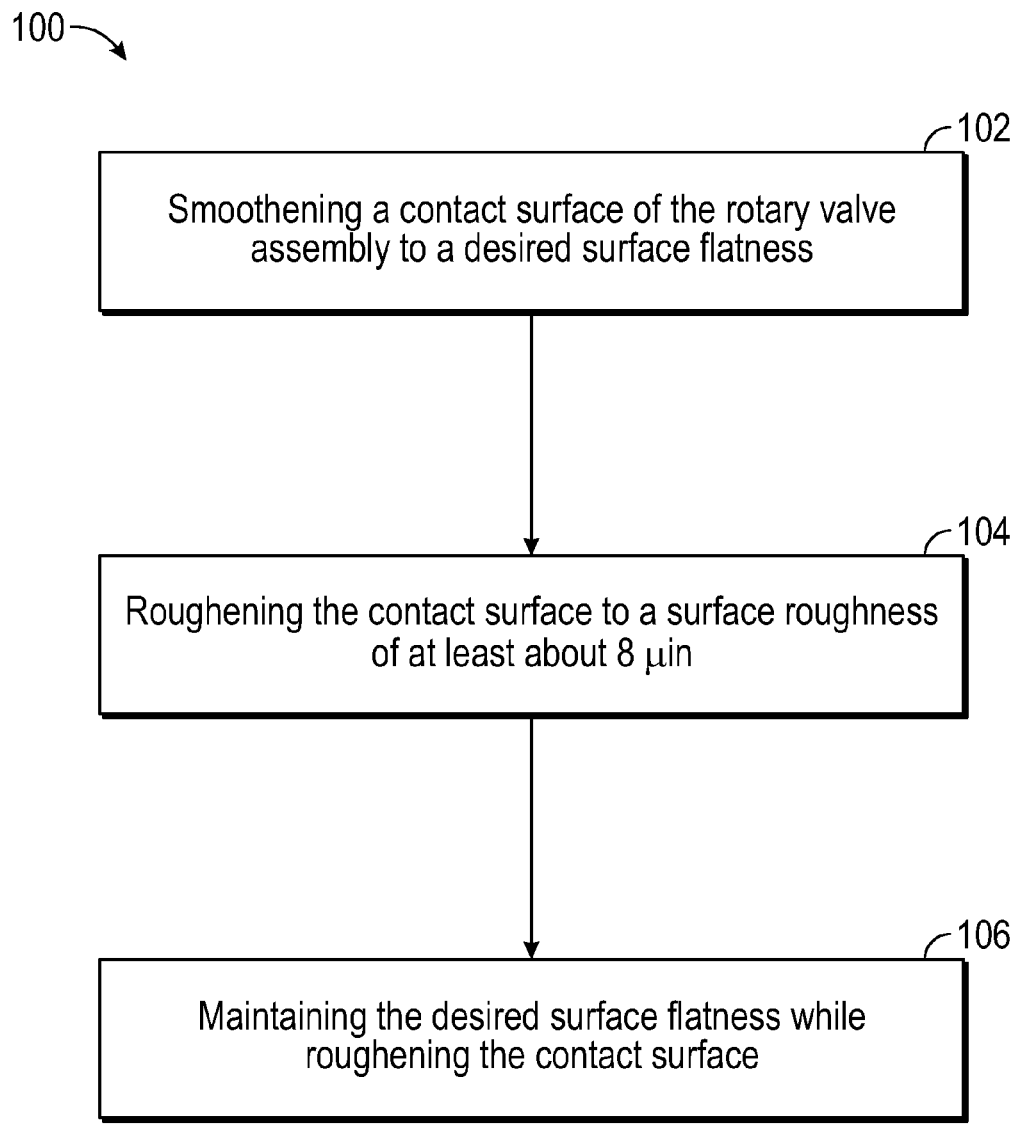
FIG. 5 is a flow diagram illustrating a method of modifying the contact surface of the rotary metering valve assembly for reducing gauge wringing.

A method of modifying a contact surface of a rotary metering valve assembly for reducing gauge wringing 100 is also provided, as illustrated in FIG. 5 and with reference to FIGS. 1-4. The rotary metering valve assembly 10 and, more particularly, the contact surface(s) of the stationary body plate 12 and the valve plate 16, have been previously described and specific structural components need not be described in further detail.

The method of modifying a contact surface 100 includes smoothening 102 a contact surface of the rotary valve assembly 10 to a desired surface flatness. As discussed above, the desired surface flatness is typically less than or about 2.4 μm (about 93 μin). Any suitable machining process may be employed to achieve the desired surface flatness. In one embodiment, a lapping process is employed. FIG. 3 illustrates the first contact surface 18 with a first roughness.

Subsequently, the contact surface is roughened to a surface roughness 104. Upon completion, the surface roughness of the contact surface is typically greater than about 8 μin. In one embodiment, the surface roughness ranges from about 0.2 μm to about 0.8 μm (about 8 μin to about 32 μin). In yet another embodiment, the surface roughness is about 0.6 μm (about 24 μin). The enhanced roughness is shown as a second roughness in FIG. 4. As with achieving the desired surface flatness, any suitable machining process may be employed to achieve the desired surface roughness. In one embodiment, an abrasive paper is used to roughen the contact surface, however, numerous other processes may be employed, such as grit blasting or chemical etching. During roughening 104 of the contact surface, the desired surface flatness is maintained 106.

Advantageously, requirements for operation of the rotary metering valve assembly 10 during system failure conditions may be met. Specifically, the embodiments described herein allow the valve assembly to operate at higher pressures while maintaining consistent friction behavior. By providing a contact surface with a minimum required surface roughness that is suitable for the particular application, the advantages described above are accomplished.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A rotary metering valve assembly comprising:
a stationary body plate having a first contact surface and a metering orifice; and
a valve plate having a second contact surface disposed in contact with the first contact surface of the stationary body plate, wherein the valve plate is configured to rotate relative to the stationary body plate to obscure the metering orifice in a direction of a fluid velocity profile;
wherein at least one of the first contact surface and the second contact surface comprises a surface flatness of less than 2.4 μm and greater than 1 μm, a smoothened original surface roughness of less than 0.2 μm, and an enhanced surface roughness of at least 0.2 μm.

2. The rotary metering valve assembly of claim 1, wherein the surface roughness ranges from 0.2 μm to 0.8 μm (8 μin to 32 μin).

3. The rotary metering valve assembly of claim 1, wherein the surface roughness is 0.6 μm (24 μin).

4. The rotary metering valve assembly of claim 1, wherein the rotary metering valve assembly comprises a portion of a fuel metering unit for a gas turbine engine.

5. The rotary metering valve assembly of claim 4, wherein the rotary metering valve assembly is disposed on an aircraft.

6. The rotary metering valve assembly of claim 1, wherein only the first contact surface comprises the surface flatness of less than 2.4 μm (93 μin) and greater than 1 μm and the surface roughness of greater than 0.2 μm (8 μin).

7. The rotary metering valve assembly of claim 1, wherein only the second contact surface comprises the surface flatness of less than 2.4 μm (93 μin) and greater than 1 μm and the surface roughness of greater than 0.2 μm (8 μin).

8. A method of modifying a contact surface of a rotary metering valve assembly for reducing gauge wringing, the method comprising:
smoothening a first contact surface of a stationary body plate having a metering orifice to a desired surface flatness;
smoothening a second contact surface of a valve plate configured to rotate relative to the stationary body plate to obscure the metering orifice;
roughening the first contact surface and the second contact surface to a surface roughness ranging from 0.2 μm to 0.8 μm (8 μin to 32 μin);
roughening at least one of the first contact surface and the second contact surface to a surface roughness greater than 0.8 μm; and
maintaining the desired surface flatness while roughening the first contact surface and the second contact surface.

9. The method of claim 8, wherein the desired surface flatness comprises a surface flatness of less than 2.4 μm (93 μin) and greater than 1 μm.

\* \* \* \* \*